United States Patent
Steger et al.

[11] Patent Number: 5,942,872
[45] Date of Patent: Aug. 24, 1999

[54] METHOD OF CONTROLLING A STEPPING MOTOR

[75] Inventors: Roland Steger, Weil in Schönbuch; Alfred Kizler, Korntal—Münchingen; Bernhard Herzog, Stuttgart, all of Germany

[73] Assignee: Moto Meter GmbH, Leonberg, Germany

[21] Appl. No.: 08/981,816
[22] PCT Filed: Jun. 13, 1996
[86] PCT No.: PCT/DE96/01025
  § 371 Date: Apr. 2, 1998
  § 102(e) Date: Apr. 2, 1998
[87] PCT Pub. No.: WO97/00554
  PCT Pub. Date: Jan. 3, 1997

[30] Foreign Application Priority Data

Jun. 16, 1995 [DE] Germany ............ 195 21 445

[51] Int. Cl.⁶ .................................. H02P 8/22
[52] U.S. Cl. .......... 318/696; 318/685; 324/429; 324/433; 340/636; 354/289.1; 354/289.12
[58] Field of Search .................. 318/696, 685, 318/138, 139; 324/429, 433; 340/636; 354/289.1, 289.12, 289.11, 465, 469, 470; 352/170, 172

[56] References Cited

U.S. PATENT DOCUMENTS

| | | | |
|---|---|---|---|
| 4,161,679 | 7/1979 | Kohn et al. | 318/685 |
| 4,584,512 | 4/1986 | Pritchard | 318/696 |
| 4,612,841 | 9/1986 | Yoshikawa | 84/484 |
| 4,694,410 | 9/1987 | Murata | 364/558 |
| 5,426,371 | 6/1995 | Salley et al. | 324/429 |
| 5,521,671 | 5/1996 | Aoki et al. | 354/289.1 |

OTHER PUBLICATIONS

"The Stepping Motor and the Duration of Its Step," Feinwerktechnik and Messtechnik 99(7–8): 327–332, 1991 by Klaus Mayer*.

*Primary Examiner*—Paul Ip
*Attorney, Agent, or Firm*—Kenyon & Kenyon

[57] ABSTRACT

A method and a device for controlling a stepping motor in which the width of step and the direction of rotation of the stepping motor are determined in a controller and sent to a control arrangement for controlling the stepping motor. Upon each step clock signal from the controller, a step is carried out. The step width output by the controller is divided by the control circuit into a plurality of smaller partial steps the step width of which is smaller than the step width output by the controller, and these partial steps are sent in several time-staggered pulses by the control circuit to the stepping motor.

5 Claims, 2 Drawing Sheets

METHOD OF CONTROLLING A STEPPING MOTOR

BACKGROUND INFORMATION

From the article "The Stepping Motor and the Duration of Its Step," Feinwerktechnik und Messtechnik 99(7–8):327–332, 1991, by Klaus Mayer, a stepping motor is known which has a permanent-magnet rotor arranged on a motor shaft, the rotor rotating within the rotating magnetic field of two coil systems. For the control of this motor, the coils are acted on alternately by current. For each sampling of action of the current, the rotor places itself in a given stable position. Movement from one such stable position into the following stable position in the direction of rotation of the rotor for another sampling of action of the current is referred to as a step. In this connection, one distinguishes between different types of stepping operation. There are known in this connection full-step operation, half-step operation, and micro-step operation. Micro-step operation is characterized by the fact that the current samplings for the coils of the stepping motor extend in discretely approximated sinusoidal curves. The division of the rotation of the rotor into individual micro-steps together with a maximum speed of revolution with which the rotor is to rotate gives the maximum control-step clock frequency with which the stepping motor is to be controlled. For example, a micro-step of 1/32°, referred to the pointer shaft of a geared stepping motor, with a maximum angular speed of rotation of the pointer of 400°/sec results in a control-step clock frequency of 12.8 kHz for the stepping motor.

SUMMARY OF THE INVENTION

The method of the present invention for controlling a stepping motor has the advantage, as compared to the related art, that, despite a low control-step clock frequency, a higher control resolution in the form of smaller partial steps is obtained, as a result of which the noise developed by the stepping motor is less, particularly at low speeds of rotation. Furthermore, the movement of a pointer which is driven in rotation by the stepping motor is more uniform. Furthermore, the expense for the circuitry is less, since circuits which provide a lower control-step clock frequency are generally less expensive and more reliable. A control circuit which is adapted to be connected in front of the stepping motor and is as a rule a microcontroller is thus relieved by the method from tasks which require lengthy calculating times.

If the first partial step is carried out with the step timing, the construction of the circuit is thereby simplified, since the step timing itself can serve for the triggering of the first partial step.

If the partial steps are carried out with a constant time delay after each first partial step, a particularly low circuit expense results for the production of the partial-step timing pulses.

If the time delay between the partial steps is decreased with increasing step clock frequency, there is thus obtained a constant number of partial steps for each full step, as a result of which there is no reduction in the resolution into partial steps upon an increase in the step timing frequencies.

The use of a phase-locked loop (PLL) circuit for the production of the partial-step clock frequency is particularly advantageous, since, on the one hand, there is thereby obtained the automatic following up of the partial-step clock frequency with the full step frequency and, on the other hand, divider-unrelated frequency ratios between partial-step clock frequency and step clock frequency can also be obtained.

The device of the present invention for controlling a stepping motor has the advantage, over the related art, that the control device need have only a low control step clock frequency and that, in this connection, nevertheless a higher control resolution in the form or smaller partial steps takes place, as a result of which the noise developed by the stepping motor is less, particularly at low speeds of rotation.

A monostable flip-flop constitutes a particularly economical means of obtaining a constant period of delay between the partial-step pulses.

DETAILED DESCRIPTION

Figure 1:
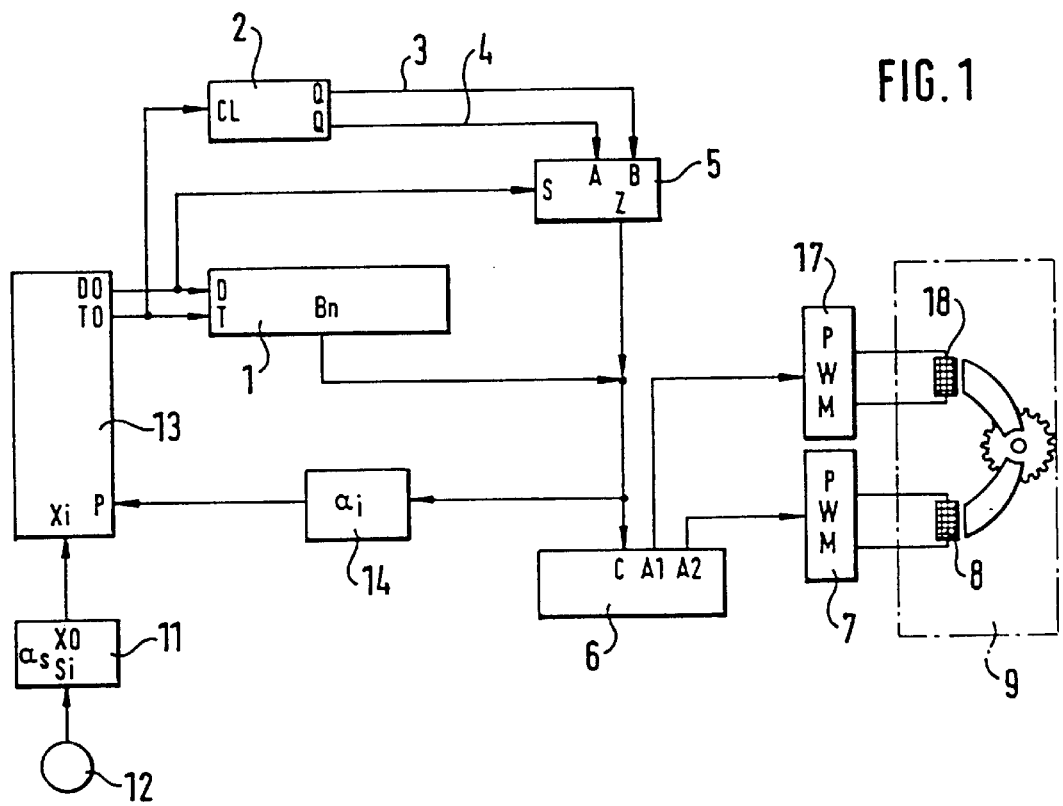
FIG. 1 illustrates an embodiment of a circuit for the control of a stepping motor according to the present invention.

FIG. 1 shows a first embodiment of the present invention in which the basic concept of the invention is integrated in a control circuit 20. This control circuit 20 is arranged between a controller 13 and a stepping motor 9 and effects the control of the stepping motor, with the advantages explained in the introduction to the specification. The controller 13 has an input Xi which is connected with a desired-angle output Xo or a desired-position transducer 11, the signals of a sensor 12 being fed to a sensor input Si of the desired-position transducer 11. Two outputs of controller 13 are fed to control circuit 20. They are the direction output Do, which indicates the direction of rotation, and the clock output To, which is responsible for the step advance. Direction output Do of controller 13 is connected to a direction input Dir of a counter 1, and clock output To of controller 13 is connected to a clock input T of counter 1. The step-advance signal of clock output To is furthermore connected to reset input C1 of a monostable flip-flop 2. Monostable flip-flop 2 has a positive output Q and an inverted output Q'. The positive output Q is connected via a first output line 3 to a first input B of a controlled changeover switch 5. Similarly, inverted output Q' is connected via a second output line 4 to a second input A of the controlled changeover switch (multiplexer) 5. Furthermore, a connection is provided between direction output Do and a selector input S of the controlled changeover switch 5 which counts the bits 1 to n corresponding to the angular position for both directions of rotation. The controlled changeover switch 5 has a selection output Z which is connected to a counter 21. Here, the value supplied by selection output Z is assigned a bit position, namely the lowest value bit 0 in a binary coded value. The content of counter 21 is then continued with the content of counter 1. Since counter 1 supplies the bit positions bit n to 1, the one composite binary number with the bit positions bit 0 to n results at an interconnection point. This common counter reading is fed to a counter input C of an [allocating means 6] allocating device 6 and furthermore, via an actual-position transducer 14, to a position input P of controller 13. [Allocating means 6] Allocating device 6 has a first output A1 and a second output A2, which outputs are connected to pulse-width modulators 7, 17 respectively. Pulse-width modulators 7, 17 are connected to corresponding coils 8, 18 respectively, which serves to provide the rotating magnetic field for a stepping motor 9.

Sensor 12 serves to detect a measurement value which is to be displayed, for example the speed of revolution of a motor vehicle engine. The result of the measurement by the sensor 12 passes, via the sensor input Si, to the desired-position transducer 11 in which an allocating of the desired angle $\alpha_s$ to the measured value takes place. Such an allocating can be effected, for instance, by means of a stored table. The desired angle $\alpha_s$ corresponds to the position which is to be moved to by the stepping motor 9 so that the measurement value measured can be made known to an observer by a pointer on a dial, the pointer being mounted on a stepping motor 9 by which it is driven in rotation. In controller 13, the difference angle $\Delta\alpha$ is calculated by formation of the difference between the desired angle $\alpha_s$ and the actual angle $\alpha_I$, and thereupon the number of steps necessary to pass over this angle is calculated. Controller 13 furthermore contains a clock generator which, in accordance with the calculated number of steps, provides this same number of clock pulses for the step timing for control of stepping motor 9. In this connection, it may in particular be provided that the step clock frequency also increases with an increase in the difference angle $\Delta\alpha$. In this way, a behavior of the pointer is produced which is pleasing to the eye of the observer, since the measure of moving over a large angle with a high speed of revolution and over a small angle with a small speed of revolution results in a turning behavior of the pointer which has been found pleasing by the viewer. From the sign of the difference angle $\Delta\alpha$, the controller 13 furthermore determines the direction of rotation in which the rotor of the stepping motor 9 is to move. The direction of rotation is made known in the form a binary direction signal via direction output Do on the one hand to counter 1 and, on the other hand, to controlled changeover switch 5. The step clock signal which serves via the clock input T of the counter 1 for the advancing of counter 1 serves furthermore for the control of monostable flip-flop 2. If the latter is at rest, then a logical high signal (logical 1) is present at the positive output Q and a logical low signal (logical 0) is present at the inverted output Q'. If a positive time-pulse flank occurs on reset input CL, then monostable flip-flop 2 is reset for a predetermined length of time, i.e. output Q is set to logical 0 and inverted output Q' is set to logical 1. For positive direction of counting, the direction signal produces at the selection input S of controlled changeover switch 5 a switching of input B to selection output Z. In this way, a connection is present between positive output Q and counter input C. As soon as the predetermined length of time which has been set in the monostable flip-flow 2 has expired, positive output Q flips back to the logical high level. Selection output Z of controlled changeover switch 5 is brought to a counter 21 which is combined as lowest value bit 0 with the counter reading bit n—bit 1 of the counter 1—to form a single counter reading at interconnection point 22. Selection output Z thus forms, via counter 21, the lower-value part of the common counter reading at interconnection point 22 and the counter reading of counter 1 forms the higher-value part of the common counter reading at interconnection point 22 so that the counter reading with the positions bit n–bit 0 is present at the interconnecting point 22 and arrives, on the one hand, at counter input C of [allocating means 6] allocating device 6 and, on the other hand, at position input P of controller 13. In [allocating means 6] allocating device 6, the common counter reading is associated with control voltage values which are fed via [allocating means] allocating device outputs A1, A2, to pulse-width modulators 7, 17. The allocation in [allocating means 6] allocating device 6 may take place, for instance, again via a table which is stored there. However, conversion by means of an algorithm running in [allocating means 6] allocating device 6 is also possible. In the pulse-width modulators 7, 17 the arriving amplitude values are converted into pulse-width modulated signals which are fed to coils 8, 18. In this way, coils 8, 18 receive precisely the current which is necessary in order to arrive at the next position value corresponding to the common counter reading. Furthermore, the common counter reading arrives as actual-position value at controller 13 via position input P.

With this circuit the result is obtained that, upon the further advance of the rotor with each pulse of the step clock signal the step is carried out in the form of two partial steps. The first of these two partial steps is carried out here in synchronism with the step timing, while the second partial step is carried out as a function of the duration of the flip of monostable flip-flop 2. In this connection counter 1 is responsible for the counting the full steps, while controlled changeover switch 5 contains the lowest value bit of the counting process and switches it accordingly. The output signal of controlled changeover switch 5 and that of counter 1 together form the common counter reading for partial steps which arrives at [allocating means 6] allocating device 6, so that initially only half a step takes place and, after expiration of the duration of the flip, the second half step takes place. It is also contemplated to divide the step into more than two partial steps. Depending on the case of use, full steps, half steps or, in particular, also micro-steps can be considered as steps within the meaning of the present invention.

Figure 2:
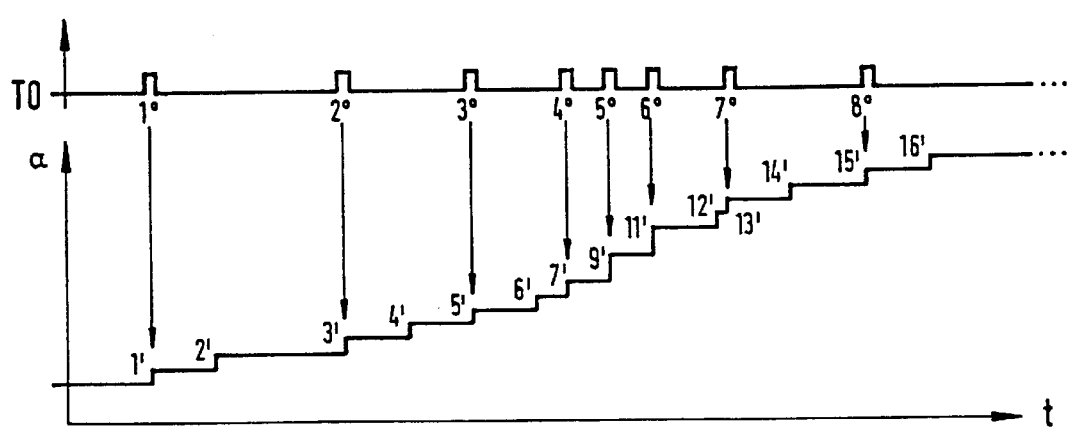
FIG. 2 illustrates an example of the sequence of several control-step timing pulses and of the partial steps then taking place.

As shown by way of example in FIG. 2, a first clock pulse 1° of the step clock signal (To) results in a first partial step 1' which is followed, spaced in time, by a second partial step 2'. Similarly, a second clock pulse 2° of the step clock signal causes a partial step 3' which in its turn is followed at a predetermined time interval by another partial step 4'. This applies in similar manner to the next clock signal 3° with the partial steps 5' and 6'. If the step clock frequency of the step clock signal now increases, then the time between two successive clock pulses drops below the value of the flip time of the monostable flip-flop 2. Thus, no further partial step takes place here any longer, but a full step is immediately taken upon the occurrence of the next clock pulse. Thus, in fact, switching to a coarser step division is effected. This is generally, however, not critical, since such high angular speeds of revolution normally occur for only a very short time, for instance during the gear change operations of the motor vehicle in the case of a tachometer. Furthermore, the emission of noise becomes in any event more and more independent of the resolution of the division of the step with increasing angular velocity of the rotor.

If one nevertheless would like to avoid losing the division of the step into partial steps upon higher angular speeds of revolution, this can be done by replacing the monostable flip-flop 2 and the controlled changeover switch 5 by a PLL circuit unit 15.

Figure 3:
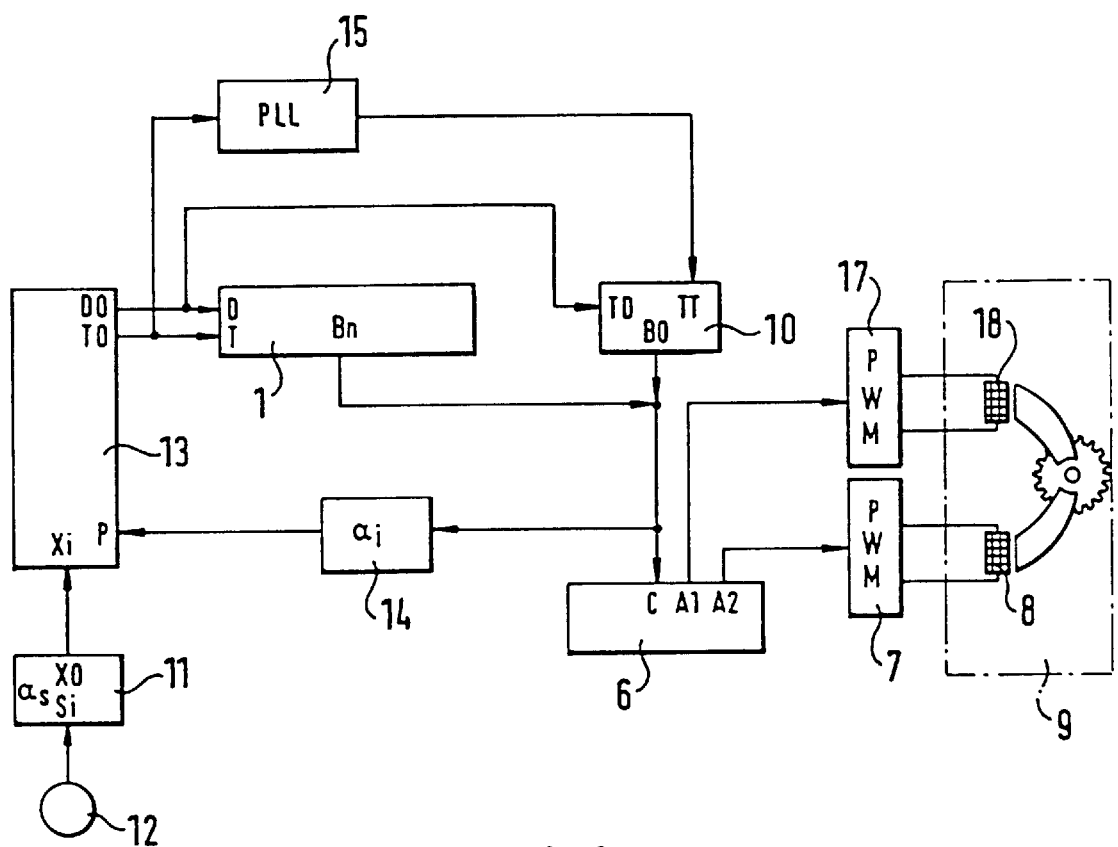
FIG. 3 illustrates another embodiment of a circuit for the control of a stopping motor according to the present invention.

Such an arrangement is shown in FIG. 3. This arrangement differs from the arrangement in FIG. 1 by the following features. Monostable flip-flop 2 is replaced by PLL circuit unit 15. Furthermore, controlled changeover switch 5 has been replaced by a partial-step counter 10. PLL circuit unit 15 has a single clock output which is fed to a partial clock input TT of partial-step counter 10. Direction output D is here furthermore connected to a partial direction input TD of the partial-step counter 10. Partial-Step counter 10 has a partial-step counter output B0 which is fed, together with counter output Bn of counter 1, to counter input C of [allocating means 6] allocating device 6. Partial-step counter output B0 and counter output Bn are in this connection combined together to form a single counter reading, the counter reading of the partial step counter 10 being used as the lower part of the common counter reading and the counter reading of the counter 1 being used as the higher-value part of the common counter reading. This common counter reading is sent to counter input C of [allocating means 6] allocating device 6.

With PLL circuit unit 15, it is possible to reduce the step clock frequency in the manner that suitable division ratios are used in the dividers which are contained in PLL circuit unit 15. In this way, the partial-step clock frequency then increases parallel to the step clock frequency. With embodiments containing PLL circuits, a filtering of the partial-step clock frequency can furthermore be obtained by suitable design, as a result of which an adjusting of the pointer behavior is possible. Furthermore, PLL circuits are particularly suitable for establishing divider-independent ratios between the step clock frequency of the step time signal To and the partial-step clock frequency. Thus it is possible, for instance, to establish a step clock frequency of 12 steps per second and a partial-step clock frequency of 32 steps per second. In this way, practically any desired adaptation between controllers 13 and stepping motors 9 can be obtained. Instead of PLL circuit unit 15, some other frequency multiplier can also be used, for instance in digital form.

It is furthermore contemplated that certain functions be taken from controller 13 into the remaining circuit, so that, for instance, only the desired angle $\alpha_s$ and/or the desired angular speed is fed to this circuit and it produces the step time pulses itself. In this way, then, with the circuit described here, the result can be obtained that the resolution for the division of the step for stepping motor 9 be selected high despite only a slight data word width which is used for the description of the desired angle $\alpha_s$ or the desired angular speed at the input of the circuit. Pulse width modulators 7, 17 can preferably be developed in the form of push-pull output stages interconnected in the form of an H-bridge. For example this method can be used for geared stepping motors in display instruments for motor vehicles.

What is claimed is:

1. A method for controlling a stepping motor for driving a pointer for an indicating instrument, the method comprising the steps of:

determining, in a controller, a step width and a direction of rotation of the stepping motor;

transmitting the step width and the direction of rotation from the controller to a control circuit, the control circuit controlling the stepping motor and rotating the stepping motor one step upon receiving each of a plurality of step clock signals from the controller;

dividing, in the control circuit, the step width received from the controller into a plurality of partial steps, wherein a further step width of the partial steps is less than the step width received from the controller;

generating a composite binary number, the composite binary number representing an actual position of each step, wherein the composite binary number includes a lower value bit supplied by a changeover switch and at least one higher value bit supplied by a counter;

transmitting the composite binary number to the controller and to an allocating device, the allocating device transmitting a first signal for controlling the stepping motor;

converting the composite binary number to a plurality of time-staggered pulses corresponding to the plurality of partial steps; and transmitting the time-staggered pulses from the control circuit to the stepping motor.

2. The method according to claim 1, wherein a first of the plurality of partial steps is carried out with a step timing.

3. The method according to claim 2, wherein a second and third of the plurality of partial steps are carried out, in each case, with an approximately constant delay time after the first partial step.

4. The method according to claim 3, wherein the delay time decreases with an increasing step clock frequency.

5. The method according to claim 4, wherein a partial stop clock frequency is derived from the step clock frequency via a PLL circuit unit.

* * * * *